UNITED STATES PATENT OFFICE.

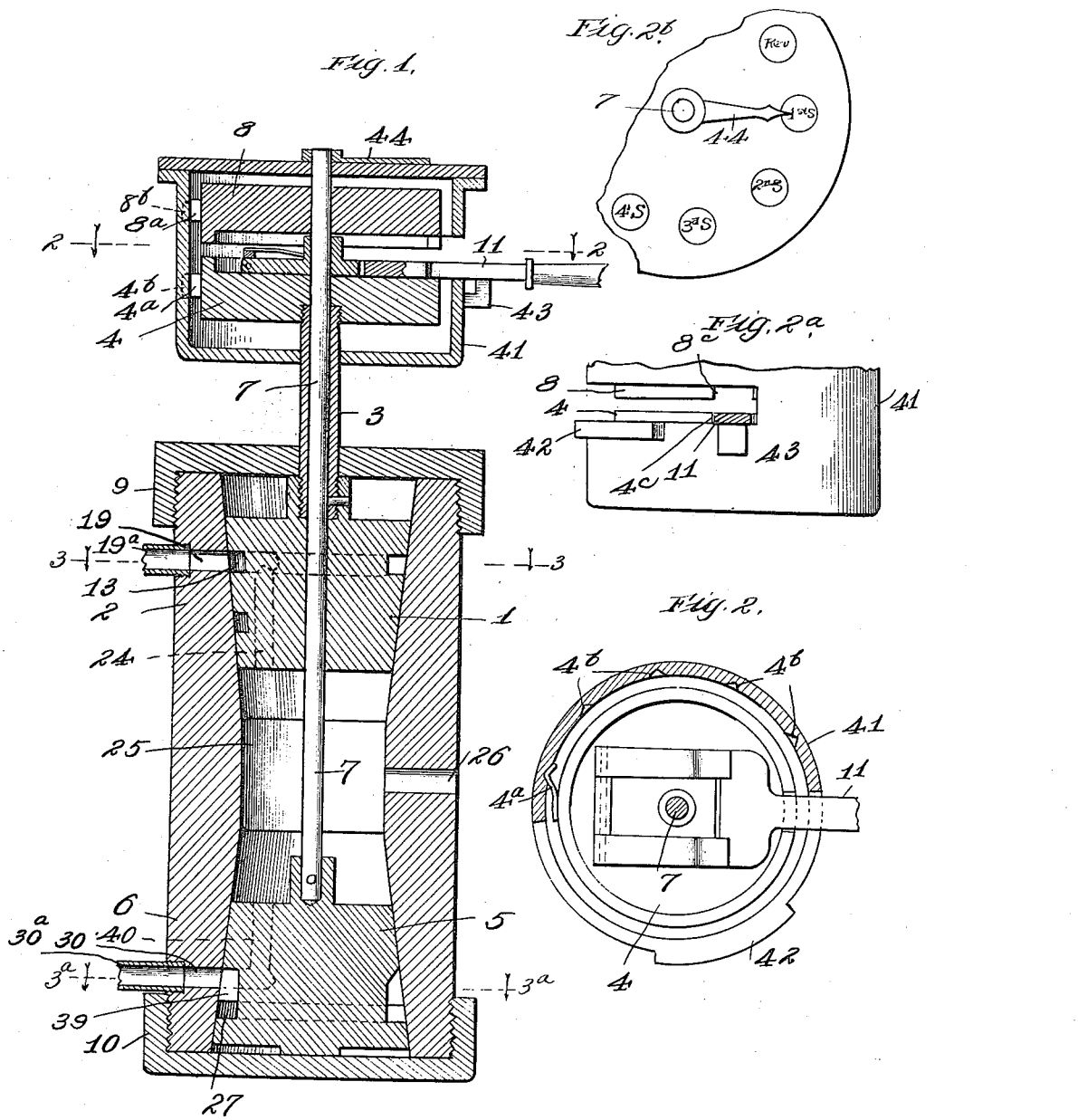

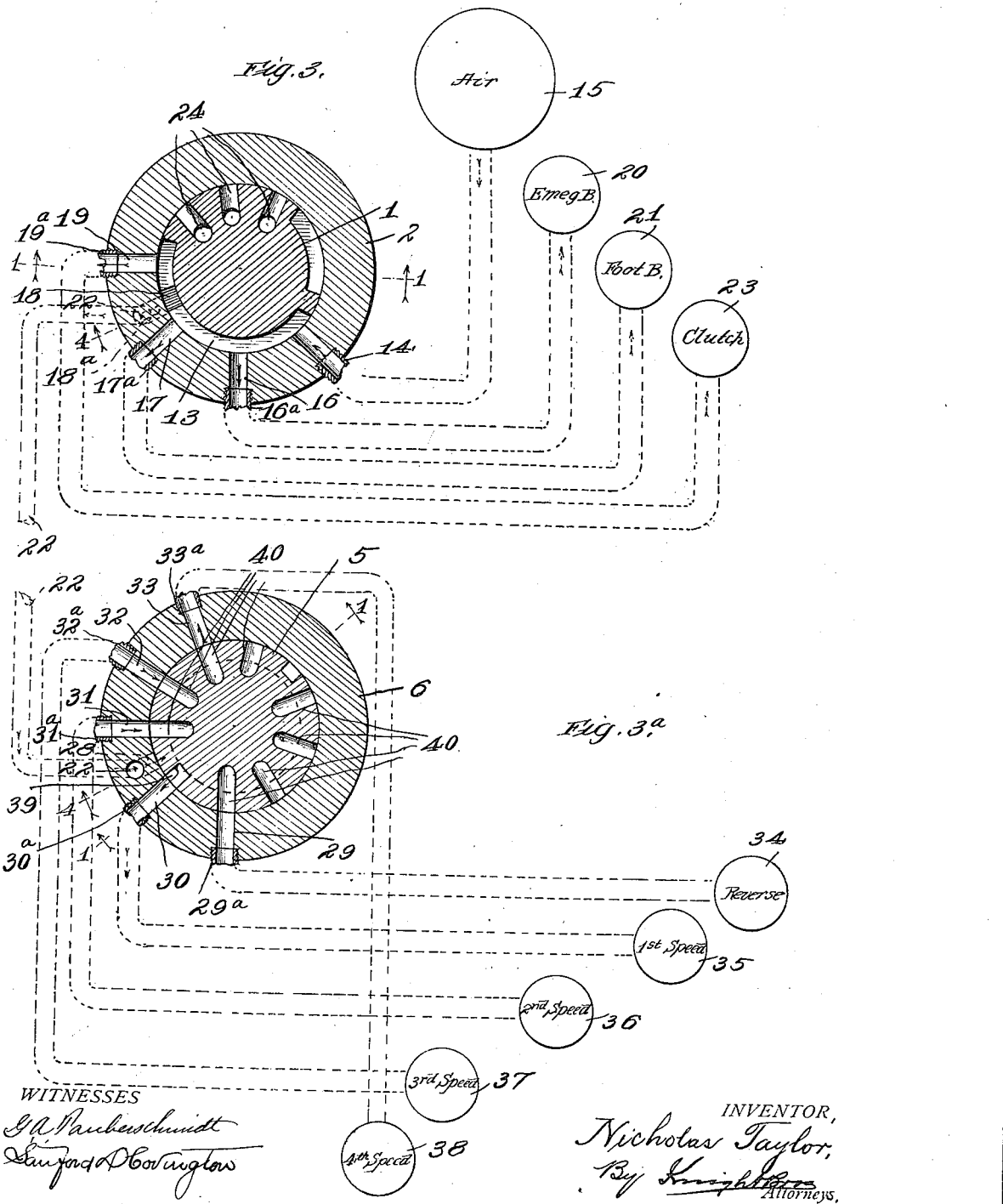

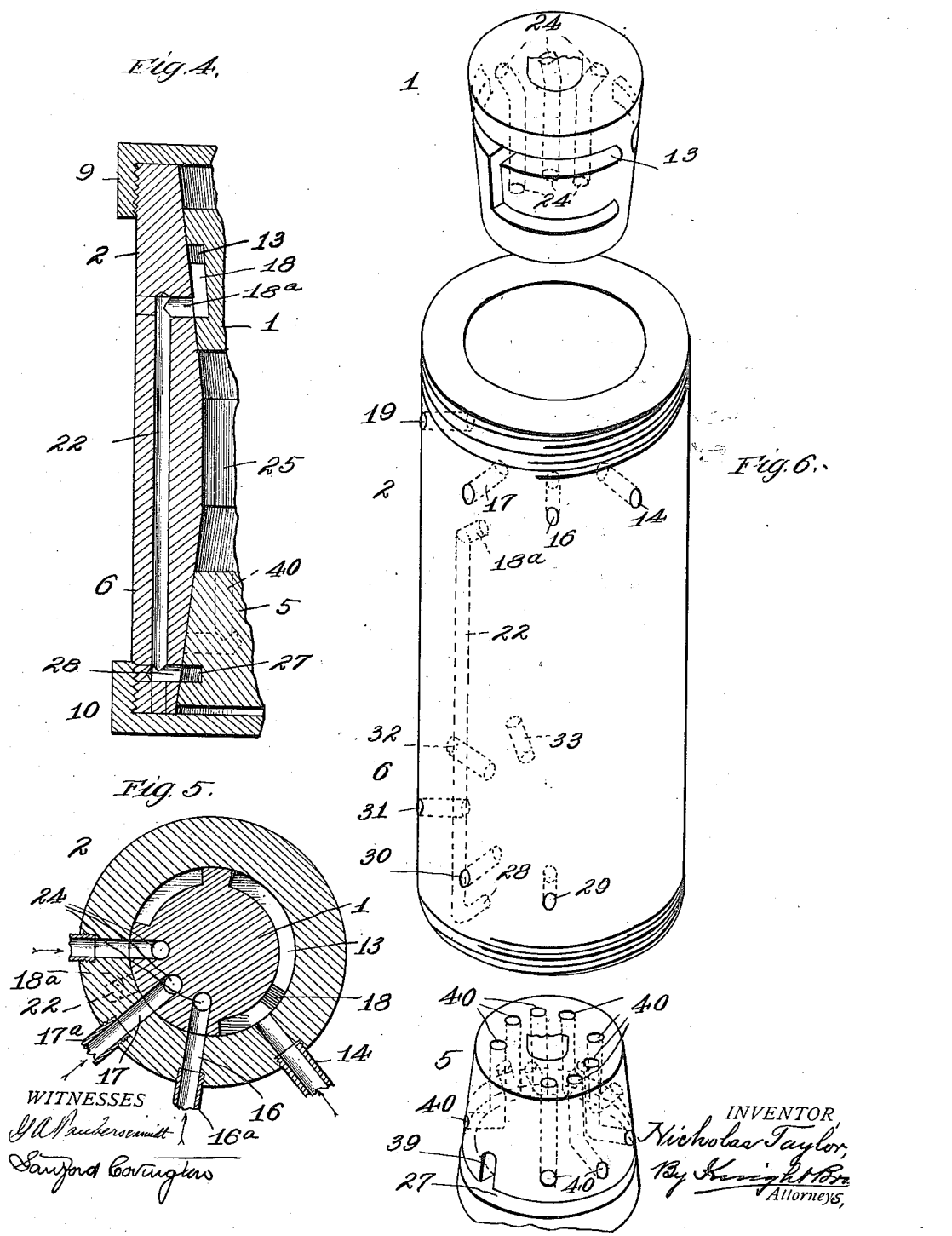

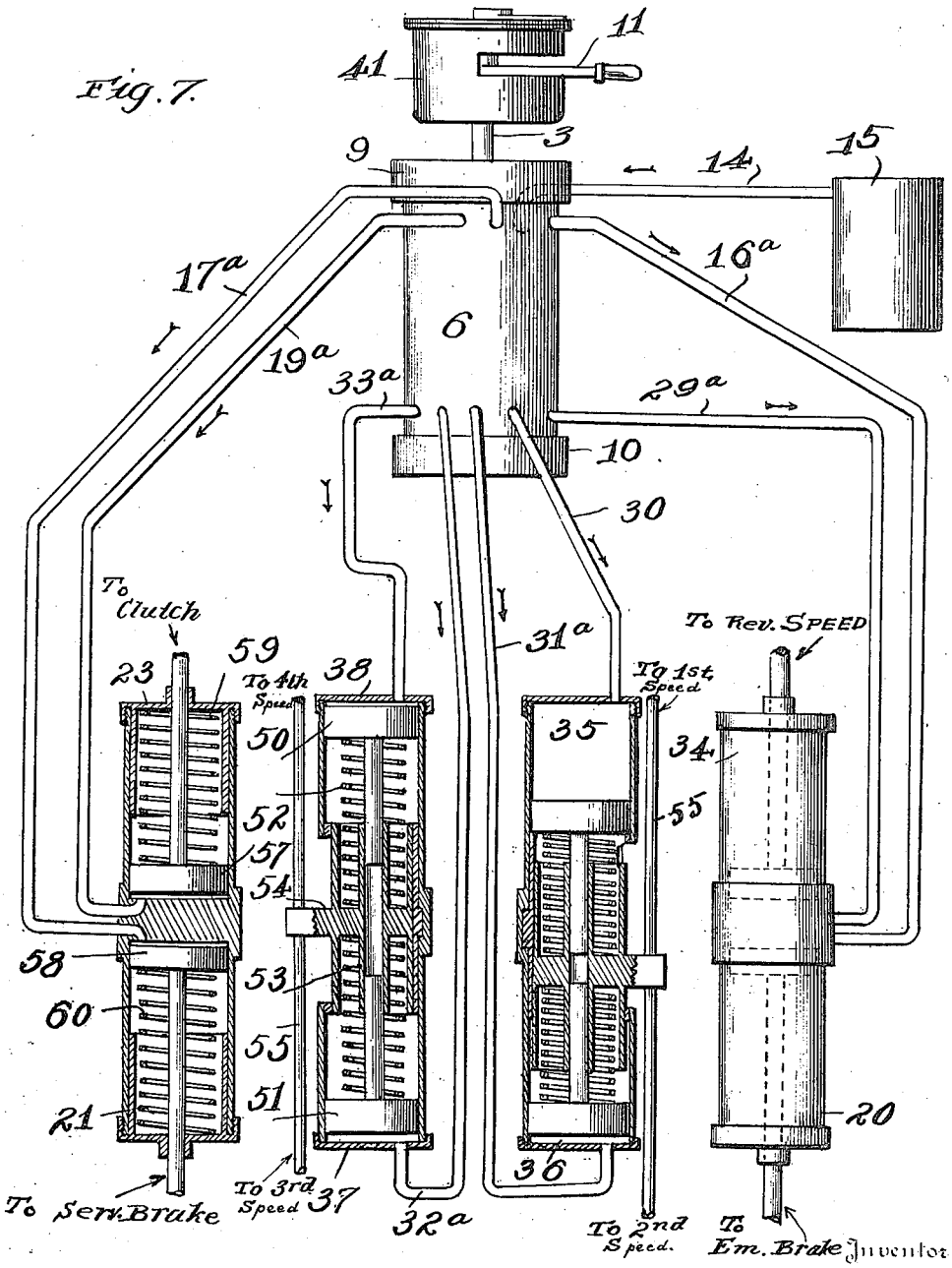

NICHOLAS TAYLOR, OF MUSKOGEE, OKLAHOMA, ASSIGNOR, BY DIRECT AND MESNE ASSIGNMENTS, OF THREE-FOURTHS TO TAYLOR AUTOMATIC AIR CONTROL COMPANY, A CORPORATION OF OKLAHOMA, ONE-EIGHTH TO E. A. EDMONDSON, AND ONE-EIGHTH TO FRANK STROUPE, ALL OF MUSKOGEE, OKLAHOMA.

FLUID-PRESSURE AUTOMOBILE CONTROL MECHANISM.

1,141,589. Specification of Letters Patent. Patented June 1, 1915.

Application filed October 26, 1912. Serial No. 727,994.

*To all whom it may concern:*

Be it known that I, NICHOLAS TAYLOR, a citizen of the United States, and resident of Muskogee, in the county of Muskogee and State of Oklahoma, have invented certain new and useful Improvements in Fluid-Pressure Automobile Control Mechanism, of which the following is a specification.

This invention relates to means, actuated by fluid pressure medium, for introducing, at will, any one of the several mechanisms which control the driving and braking elements of a self-propelled vehicle, and particularly to the means through which the supply of the pressure medium to the actuators of the several elements is controlled at the will of the operator.

One object of the invention is to provide a valve mechanism simple in construction and convenient in operation, to which end the invention employs a pair of rotary valves, independently adjustable but having a common operating means; said operating means being movable into operating relation to either valve at will, but being out of operating relation to each valve when it is in operating relation to the other valve; one of said valves called the selecting valve having connections through which it selectively controls the actuator of any one of several transmission elements (one or more speed gears, with or without reverse gear), and the other of said valves, called the master valve, controlling the supply of pressure medium to the selecting valve, as well as to a master driving member, and one or more braking members.

Another object is to prevent certain sequence of actions between certain of the controlling elements, such as selecting or changing a speed gear while the prime mover is in driving relation to such speed gear, to which end the common operating member is prevented from reaching the selecting valve until after it has moved the master valve to release the master controlling element.

Other objects relate to considerations of economy of production, durability in use, and convenience in operation of the several mechanisms or parts entering into the construction of elements and the above defined general organization of said elements.

As hereinafter pointed out in the claims, some of the novel features of the present invention reside in certain coöperative relationships existing between certain of the elements, of which the disclosed constructional embodiments are merely illustrative rather than definitive, while other novel features reside in the general organization of such elements; and still others reside in the constructional characteristics of the particular elements herein disclosed as the preferred instrumentalities through which to realize such coöperative relationships and general organizations.

One embodiment of the subject matter of the present invention is shown by way of illustration in the accompanying drawings, in which—

Figure 1 is an axial section of the complete valve on the line 1—1, Figs. 3 and 3$^a$; the relations of the mechanism controlled by said valve being suggested schematically; Fig. 2 is a section on the line 2—2 of Fig. 1; Figs. 2$^a$ and 2$^b$ are detail views of the casing for the operating arm and the index therefor, respectively; Figs. 3 and 3$^a$ are sections of the upper and lower valves; Fig. 3 being a section on the line 3—3, and Fig. 3$^a$ being a section on the line 3$^a$—3$^a$ of Fig. 1; Fig. 4 is an axial section on the line 4—4 of Figs. 3 and 3$^a$; Fig. 5 is a transverse section through the master valve when in position to exhaust all the controlling elements, thereby releasing the clutch and permitting the brakes to apply under their own contained power, and Fig. 6 is a perspective view of the casing and its valves segregated; Fig. 7 is an assembled view partly in section, showing diagrammatically the relative positions of the valve and the cylinders, with their connections.

Referring to Fig. 1, a master valve 1 fitted in a casing 2, is rotated through its stem 3 by an arm 4, while a selecting valve 5, fitted in the casing 6, (preferably made integral with casing 2) is rotated through its stem 7 by an arm 8. The valves are preferably in the form of taper plugs to facilitate keeping them tight, and they are held in their seats by the caps 9 and 10. A common operating arm 11 fitted to rotate around the stems 3 and 7, is adapted to move vertically into engagement with either of the valve arms 4 and 8, at the will of the operator, and to rotate either of said valve arms as hereinafter explained. A spring 12 is preferably employed to hold the arm 11 downward.

The master valve 1 is constructed with an air channel 13 adapted to communicate with the air supply pipe 14 leading from a source of compressed air 15; said air channel being circumferentially extended to adapt said channel to continue in communication with said air supply, during further rotation of the valve to bring said air channel into successive communication in the order named, with four ports 16, 17, 18 and 19 in the casing 2, connected respectively, through pipes 16ª, 17ª, duct 18ª and pipe 19ª with the releasing piston 20 of a normally applied emergency brake, the releasing piston 21 of a normally applied service brake, the supply passage 22 of the selecting valve 5, and the applying piston 23 of the master driving element or clutch. The valve 1 also has exhaust channels 24 adapted to be brought, by a counter-rotation of the valve 1, into communication in the order named, with the clutch port 19, the service brake port 17 and the emergency brake passage 16. The supply port 22 for the selecting valve 5 is offset from the transverse plane of the ports 16, 17, 18 and 19, being connected by the ducts 18ª and 18ᵇ and the port 18 with the channel 13, and said duct 18ª is adapted to continue in communication with the port 22 during that portion of the forward rotation of the master valve which brings the supply channel 13 into communication with the clutch port 19. But when the exhaust channel 24 reaches the port 18 in counter-rotation of valve 1, the duct 18ª will have retreated back of port 18 leading to the selecting valve passage 22, so that air will not be exhausted back from the selecting valve, and any particular actuator, that is for the time being, supplied through said selecting valve will remain with the air trapped therein. The exhaust 24 discharges into the intermediate space 25 of the casing, whence it escapes through an exhaust port 26.

Valve 5 has a circumferentially continuous channel 27, which is fed through the passage 28 leading from the port 22, so that said channel 27 is constantly supplied with air pressure. The casing 6 is provided with ports 29, 30, 31, 32 and 33, communicating, respectively, through pipe 29ª with the reverse gear actuator 34, through pipe 30ª with the first speed gear actuator 35, through pipe 31ª with the second speed gear actuator 36, through pipe 32ª with the third speed gear actuator 37, and through pipe 33ª with the fourth speed gear actuator 38. The reverse port 29, together with the speed gear ports 30, 31, 32 and 33 are in a different transverse plane from the air channel 27, but they are adapted to be brought separately and selectively into communication with said channel 27, through the medium of a single port 39, communicating with said channel 27, and leading to the transverse plane of said ports 29—33. In this manner, selecting valve 5 may be rotated independently of the master valve 1 to establish a line of air supply from 22, through 28 to 27 and through 39 to either one of the ports 29, 30, 31, 32 or 33, so that whenever the port 18 in the casing 2 is uncovered by duct 18ª communicating with the channel 13 of the master valve, air will enter that one of the actuators 34—38 which has been selected by the position of the valve 5, and will throw in the gear having the transmission value desired. The channel 27 is made circumferentially continuous, primarily to balance the pressure on the valve 5. In order to balance pressure exerted upon the air of the duct 39, a diametrically opposite blind duct 39ª may be provided. This will be located at a point which will prevent its communicating with either of the ports 29—33. Valve 5 is further provided with exhaust ports 40 in the transverse plane of the ports 29—33 and sufficient in number to communicate with all of the ports 29, 30, 31, 32 and 33, except the particular port that is for the time being in communication with the duct 39. That is to say there are, on either side of the duct 39, a number of exhaust ports equal to the number of selecting ports, less one, unless the ports 29—33 should be symmetrically distributed around the casing 6, in which event the exhaust ports will be symmetrically distributed, so that each selecting port will be in communication with an exhaust port when it is not registering with the single supply duct 39. All the exhaust ports lead to the intermediate space 25 between the valves, so that exhaust reaches atmosphere through the port 26.

It will be understood that the valves 1 and 5 may be rotated independently of each other and made to assume any desired relative angular positions for accomplishing the purposes for which they are intended. That is to say, valve 5 may be rotated to select any one of the transmission element actuators for receiving pressure, all the others being simultaneously open to exhaust, and then while valve 5 is left in such selected position, valve 1 may be rotated to take off the brakes, and then communicate air to said valve 5 and through it to the selected transmission element to throw said element into driven relation to the motor, after which continued rotation, valve 1 throws in the clutch or master driving element, so that the motor will deliver the power to be transmitted through the already selected transmission element. Conversely valve 1 may be rotated a partial distance to exhaust air from the clutch element, thus interrupting the drive and also to close port 18 and the communication between duct 18ª and passage 22, trapping air in the selected transmission actuator, and permitting the vehicle to coast; or valve 1 may be counter-rotated still further, to exhaust air from one or both of the brakes, and permit them to act to bring the vehicle to rest.

In order to retain either of the valves 1 and 5 in the position to which it may be rotated, notwithstanding adjusting movement that may be imparted to the other of said valves, valve arms 4 and 8 are provided, respectively, with the dogs 4ª and 8ª adapted to enter the graduated notches 4ᵇ, 8ᵇ, in the casing 41, within which the arms are housed for protection and to prevent manipulation otherwise than through the common controlling arm 11. A segmental curb 42 on casing 41 is engaged by a hook 43 on operating arm 11 and extends a sufficient distance to positively prevent the operating arm 11 passing from the arm 4 of the master valve 1, to the arm 8 of the selecting valve 5, until said arm 11 has moved the valve 1 to a position where at least the clutch is thrown out, the arm being moved to where the brakes will be still held off or to a point where they are permitted to be thrown on, as may be desired. To insure engagement of the arms 4 or 8, said arms are provided with notches 4ᶜ, 8ᶜ, to admit the arm 11. If desired, in order that either valve arm may be picked up immediately, without the necessity of swinging the arm 11 to any particular point, said arms 4 and 8 can be arcuately extended and their notches multiplied. The position of the valve 1 will be realized by the effect of the clutch or the brake which it controls and which can be readily detected by an occupant of the vehicle. The position of the valve 5 will be indicated by an index 44 and the designations R (indicating reverse) and 1, 2, 3 and 4 (indicating the different speeds).

In Fig. 7 is shown the preferred arrangement of building the cylinders in pairs, the two inner pairs being for the different speeds and the two outer ones for the clutch and brakes. In the speed cylinders the pressure air is admitted at the ends by the respective pipes. A piston 50, 51 is provided at each end and guided by the central slide 54, on either side of which is a compression spring 52, 53 pushing the pistons apart. Cylinder 35 is shown in action, receiving pressure from pipe 30. On the upper piston being pushed downward, the two springs become compressed, forcing the slide downward and through the connection rod 55 the first speed gear will be thrown into action leaving however, the piston in cylinder 36 and its connection with this second speed gear undisturbed. On cutting off the pressure, the ports return into symmetrical position, actuated by the springs. The outer twin cylinders 20, 34 and 21, 23 are arranged to work oppositely from the ones just described, having their inlet pipes opening in the middle instead of at the ends. The pistons 57, 58 will therefore be pushed outward against the springs 59, 60 when pressure air is admitted.

I claim:—

1. A fluid pressure controlling system for motor vehicles, comprising a fluid-pressure controlled master-member actuator, fluid-pressure controlled selective drive-member actuators, independently adjustable master and selecting valves for controlling the supply of fluid to the respective actuators named, and means through which the master valve controls supply of fluid to the selecting valve.

2. A fluid pressure controlling system for motor vehicles, comprising a fluid-pressure controlled master-member actuator, fluid-pressure controlled selective drive-member actuators, independently adjustable master and selecting valves for controlling the supply of fluid to the respective actuators named, and means through which the master valve controls supply of fluid to the selecting valve; said master valve being adapted to exercise its control over the selecting valve in advance of controlling the master member actuator.

3. A fluid pressure controlling system for motor vehicles, comprising a fluid-pressure controlled master member actuator, fluid-pressure controlled selective drive-member actuators, independently adjustable master and selecting valves for controlling the supply of fluid to the respective actuators named, and means through which the master valve controls supply of fluid to the selecting valve, said system embodying a brake actuator and a clutch actuator, and said master valve exercising its control over the brake actuator, then over the selecting valve, and then over the clutch-actuator.

4. A fluid pressure controlling system for motor vehicles, comprising a fluid-pressure controlled master member actuator, fluid-pressure controlled selective drive-member actuators, independently adjustable master and selecting valves for controlling the supply of fluid to the respective actuators named, and means through which the master valve controls supply of fluid to the selecting valve; said system embodying a brake actuator and a master clutch actuator, and said master valve exercising its control over the selecting valve in advance of controlling the master clutch actuator; said master valve being adapted to supply pressure medium to said selecting valve and said clutch actuator in the order named, by rotation in one direction, and to exhaust pressure medium from said clutch actuator and cut off supply of pressure medium from said selecting valve, by counter-rotation.

5. In a fluid pressure control for motor vehicles, a master controlling element, a selective controlling element; independently movable valves for the respective controlling elements; and a common manipulating arm movable at will into controlling relation to either valve; said arm being out of controlling relation to each valve when in controlling relation to the other valve.

6. In a fluid pressure control for motor vehicles, a master controlling element, a selective controlling element; independently movable valves for the respective controlling elements; and a common manipulating arm movable at will into controlling relation to either valve; said arm being out of controlling relation to each valve when in controlling relation to the other valve, means being provided to prevent movement of said arm from one controlling position to the other when the master controlling valve is open.

7. In a fluid pressure control for motor vehicles, a master controlling element, a selective controlling element; independently movable valves for the respective controlling elements; and a common manipulating arm movable at will into controlling relation to either valve; said arm being out of controlling relation to each valve when in controlling relation to the other valve; said valves having controlling levers moving in parallel paths and said arm being located intermediately of said levers with transverse movement to engage either lever at will.

8. In a fluid pressure control for motor vehicles, a master controlling element, a selective controlling element; independently movable valves for the respective controlling elements; and a common manipulating arm movable at will into controlling relation to either valve; said arm being out of controlling relation to each valve when in controlling relation to the other valve; said valves having controlling levers moving in parallel paths and said arm being located intermediately of said levers with transverse movement to engage either lever at will; there being a barrier interposed to the movement of the controlling arm between said levers, corresponding in position to that portion of the path of the master element lever occupied by said lever, when said master element is in operation, thereby enforcing the inoperative position of the master element before the selective element can be changed.

9. In a fluid pressure control for motor vehicles, two independently operable rotary valves, mounted upon the same axis and, respectively, adapted to control communication of pressure fluid to independent controlling elements; arms carried by the respective valves, and a common controlling arm mounted to swing about the axis of the lever arms, and movable in the plane of said axis to engage either valve arm at will.

10. In a fluid pressure control for motor vehicles, two independently operable rotary valves, mounted upon the same axis and, respectively, adapted to control communication of pressure fluid to independent controlling elements; arms carried by the respective valves, and a common controlling arm mounted to swing about the axis of the lever arms, and movable in the plane of said axis to engage either valve arm at will, each of said valve arms having a ratchet for holding it in the position to which it is set.

The foregoing specification signed at Washington, District of Columbia, this 26 day of October, 1912.

NICHOLAS TAYLOR.

In presence of two witnesses:
ELWIN S. CLARKSON,
HERVEY S. KNIGHT.